United States Patent [19]

Bergen

[11] Patent Number: 5,034,826
[45] Date of Patent: Jul. 23, 1991

[54] DEVICE FOR REPRODUCING A LUMINANCE SIGNAL FROM A MAGNETIC RECORD CARRIER IN WHICH A FIRST AND A SECOND CORRECTION CIRCUIT BOTH USE THE SAME DELAY LINE

[75] Inventor: Franciscus H. M. Bergen, Eindhoven, Netherlands

[73] Assignee: U.S. Philips Corporation, New York, N.Y.

[21] Appl. No.: 601,593

[22] Filed: Oct. 18, 1990

Related U.S. Application Data

[63] Continuation of Ser. No. 192,031, May 9, 1988, abandoned.

[30] Foreign Application Priority Data

May 29, 1987 [NL] Netherlands ............... 8701277

[51] Int. Cl.$^5$ ............................. H04N 5/783
[52] U.S. Cl. .................. 360/10.3; 360/36.2; 360/38.1; 358/336
[58] Field of Search ............ 360/9.1, 10.1, 10.3, 360/36.1, 36.2, 38.1; 358/312, 314, 321, 327, 336, 338, 339

[56] References Cited

U.S. PATENT DOCUMENTS

| 2,996,576 | 8/1961 | Dolby | 358/336 X |
|---|---|---|---|
| 3,824,620 | 7/1974 | Langer | 360/38.1 |
| 4,283,737 | 8/1981 | Nikami | 358/312 |
| 4,283,744 | 8/1981 | Melwisch et al. | 360/10.3 |
| 4,293,869 | 10/1981 | Scholz | 358/314 |
| 4,555,734 | 11/1985 | Fukui | 358/314 |
| 4,672,469 | 6/1987 | Namiki et al. | 358/312 |
| 4,691,249 | 9/1987 | Acello | 358/336 |
| 4,731,675 | 3/1988 | Tachibana et al. | 358/336 |
| 4,837,624 | 6/1989 | Heitmann et al. | 358/336 X |
| 4,851,930 | 7/1989 | Fukuda et al. | 358/312 X |

Primary Examiner—Roy N. Envall, Jr.
Assistant Examiner—W. R. Young
Attorney, Agent, or Firm—Edward W. Goodman

[57] ABSTRACT

A device for reproducing a luminance signal from a magnetic record carrier has a first correction circuit (14, 37) to compensate for time errors in the signal being read and a second correction circuit (14, 38) to compensate for dropouts in the signal being read. The first correction circuit (37) comprises a first delay line (23) which provides a delay of half a line period (32 μs). The second correction circuit (38) comprises a delay line (25) which provides a delay of one full line period. At least a section of the delay line (25) constitutes the delay line (23) for the first correction circuit.

7 Claims, 2 Drawing Sheets

DEVICE FOR REPRODUCING A LUMINANCE SIGNAL FROM A MAGNETIC RECORD CARRIER IN WHICH A FIRST AND A SECOND CORRECTION CIRCUIT BOTH USE THE SAME DELAY LINE

This is a continuation of application Ser. No. 07/192,031 filed May 9, 1988, now abandoned.

BACKGROUND OF THE INVENTION

The invention relates to a device for reproducing a luminance signal from a magnetic record carrier in tracks which are inclined relative to the longitudinal direction of said record carrier, the speed of transport of the record carrier during reproduction being different from that during recording and a time error of approximately half a line period being introduced in the signal being read at every transition from a track read by a reproducing head to a following track to be read by the same head, which device comprises a first correction circuit for correcting said time error in response to a first control signal, and a second correction circuit for the compensation of dropouts in the signal read from the tracks in response to a second control signal, the first correction circuit comprising a first switching unit having a control-signal input to receive the first control signal, a first and a second input, and an output, and a first delay line, an input of the first correction circuit being coupled to the first input and, via the first delay line, to the second input of the first switching unit, the output of the first switching unit being coupled to the output of the first correction circuit, the second correction circuit comprising a second switching unit having a control input to receive the second control signal, a first and a second input, and an output, and a second delay line, an input of the second correction circuit being coupled to the first input of the second switching unit, and the second delay line being coupled to the second input of the second switching unit, whose output is coupled to the output of the second correction circuit.

From German Offenlegungsschrift No. 2,232,361, it is known to provide a device for reproducing a video signal from a record carrier whose tracks are inclined relative to the longitudinal direction of the record carrier with a (second) correction circuit to provide compensation for dropouts in the signal read from the tracks. To this end the device comprises a dropout detector which supplies a (second) control signal at the instant at which a dropout is detected. Under the influence of this control signal the (second) switching unit in the correction circuit is changed over, causing a signal delayed by the (second) delay line to be applied to the output of the (second) correction circuit. The (second) delay line, which provides a delay equal to the line period of the video signal, may be arranged between the input of the (second) correction circuit and the second input of the (second) switching unit, or between the output and the second input of the second switching unit. In the last-mentioned case the delay line forms a feedback system, so that the (second) correction circuit is also capable of compensating for longer dropouts.

When a video signal is recorded at the normal record-carrier speed (short play) in tracks which are inclined relative to the longitudinal direction of the record carrier, the successive tracks have an offset of 1.5 line relative to one another, see for example German Offenlegungsschrift No. 2,939,276, FIG. 2. Since each track contains 312.5 lines of a picture this means that the horizontal synchronizing signals in adjacent tracks are also situated adjacent one another.

During reproduction at a record-carrier speed which differs from that during recording (features) the reproducing head follows a line which intersects the tracks across the record carrier. During a transition from a track being read to another track to be read this means that no time errors occur between the signals read from the two tracks.

This is different if a video signal is recorded at a record-carrier speed lower than the aforementioned normal speed (long play). If this speed is half the normal speed, which means that the playing time is doubled, the successive tracks will be recorded with an offset of 0.75 line relative to one another on the record carrier. A result of this is that during reproduction at a record-carrier speed which differs from the speed during recording (features) a time error arises between the signals successively read from two tracks by a reproducing head.

Currently available video recorders are generally provided with two reproducing heads having mutually different azimuth angles and arranged at 180° from one another on a rotary head drum. One reproducing head then reads every second track and the other reproducing head reads the intermediate tracks. The time error between the signals successively read from two tracks by a reproducing head is therefore equal to half the line period, or 32 $\mu$s. The first correction circuit provides correction for this time error.

It is known to construct the first delay line in the first correction circuit as a 32 $\mu$s glass delay line.

Another method of realizing the first delay line is to use a charge-coupled device (CCD). This device serves to delay the combined chrominance and luminance signal and for this purpose it is operated with a clock frequency of for example 3.$f_s$, $f_s$ being the subcarrier frequency, which is 4.43 MHz for PAL. However, both solutions are expensive.

SUMMARY OF THE INVENTION

It is the object of the invention to provide a time-error correction which is cheaper and which, when combined with other functions, requires less storage capacity.

To this end the device in accordance with the invention is characterized in that at least a section of the second delay line constitutes the first delay line of the first correction circuit. By combining the delay lines for time-error correction and dropout correction, a substantial reduction in storage capacity can be obtained. If, moreover, the demodulated luminance signal (which after demodulation is situated in a frequency band from 0 to approximately 3 MHz) is applied to the delay line(s) constructed as a CCD delay line or lines, the clock frequency for the delay line(s) can be reduced.

It is to be noted that from Neues aus der Technik, No. 1 of 16 Feb. 1981, it is known to use the 1H-delay line for dropout compensation also to provide a 1H-delay for reading video information recorded at the normal speed (short play) during special effects (feature mode), see publication No. 615, page 2. However, this publication does not describe the use of the 1H-delay line for dropout compensation to provide a half line period delay in order to read in a feature mode information recorded in a long-play mode.

A first embodiment of the device in accordance with the invention is characterized in that the second delay line comprises two series-connected delay-line sections arranged between the output and the second input of the second switching unit, and in that one of the two delay-line sections constitutes the first delay line. The two delay-line sections each provide a delay of half a line period.

A second embodiment of the device is characterized in that the second delay line has a variable delay time and is coupled between the output and the second input of the second switching unit, in that the second delay line also constitutes the first delay line and for this purpose comprises a control-signal input for receiving a control signal, and in that the second delay line is reponsive to the first control signal to provide a delay time corresponding to that of the first delay line.

The time-error correction for the chrominance signal is provided separately by means of an additional delay of half a line period. The chrominance signal is recorded on the record carrier at such a low frequency that dropouts generally do not affect the chrominance signal. This is the reason why in general no dropout compensation for the chrominance signal is provided. Nevertheless, the total storage capacity needed is smaller than in the case that the CVBS signal (chrominance-video-blanking-sync, or the combined chrominance and luminance signal) is corrected for time errors and dropouts by means of a CCD delay line operating at a clock frequency of $3.f_s$.

BRIEF DESCRIPTION OF THE DRAWINGS

Embodiments of the invention will now be described in more detail, by way of example, with reference to the accompanying drawings. In the drawings.

DETAILED DESCRIPTION OF THE INVENTION

Figure 1:
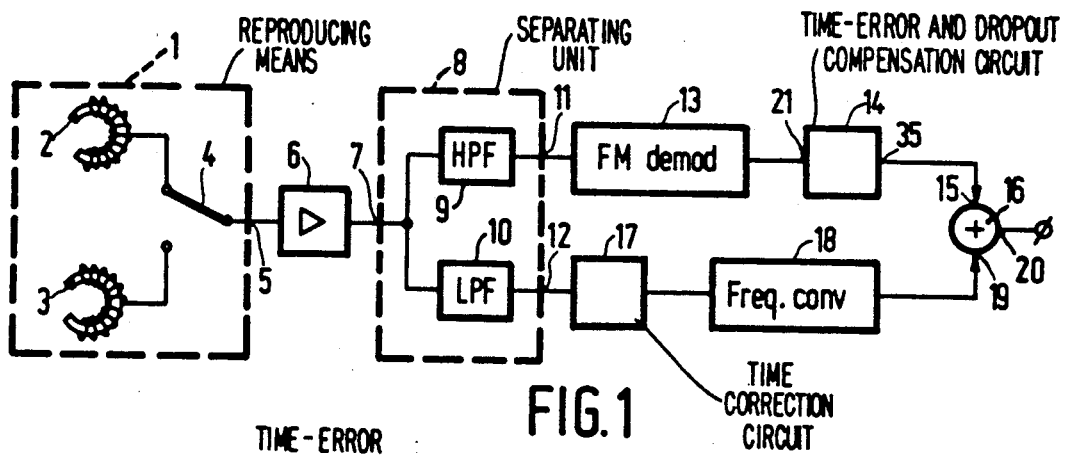
FIG. 1 shows an embodiment of the device.

FIG. 1 shows diagrammatically the device in accordance with the invention, comprising reproducing means 1. The reproducing means comprise, for example, two read heads 2 and 3 arranged on a rotatable head drum (not shown), and switching means 4. The read heads 2 and 3 read successive tracks which are inclined relative to the longitudinal direction of the magnetic record carrier. This is illustrated in FIG. 4. The two heads 2 and 3 have different azimuth angles and read only those tracks which during the recording process have been recorded by heads with corresponding azimuth angles. This means that the read head 2 reads, for example, the track 60, after which the read head 3 reads the track 61. Subsequently, the read head 2 reads the track 62 and then the read head 3 reads the track 63. The directions of movement of the record carrier 64 are indicated by the arrow 65. The arrow 66 indicates the direction of movement of a read head relative to the record carrier. When the tracks 60 or 62 are read by the read head 2, the switching means 4 are in the upper position, as shown in FIG. 1. When the tracks 61 and 63 are read by the read head 3 the switching means 4 are in the position not shown (the lower position). The frequency response characteristic of the signal read from the record carrier 64 and appearing on the output 5 of the reproducing means 1 is shown diagrammatically in FIG. 5a. It is assumed that the signal is a PAL video signal recorded on a VHS video recorder. The curve C' represents the quadrature-modulated chrominance signal, which is modulated on a carrier wave of approximately 627 kHz and which occupies a frequency band of ±500 kHz around this carrier frequency. The curve Y' indicates the frequency band within which the frequency-modulated luminance signal is situated. The reference letter z indicates the magnitude of the frequency swing of the carrier wave. From FIG. 5a it is evident that the carrier wave for a luminance signal recorded on a VHS video recorder varies between 3.8 MHz and 4.8 MHz. This means that the frequency swing is approximately 1 MHz. The curve 45 indicates the amplitude of a test luminance signal having a plurality of grey levels, plotted horizontally, as a function of time, plotted vertically.

Figure 2:
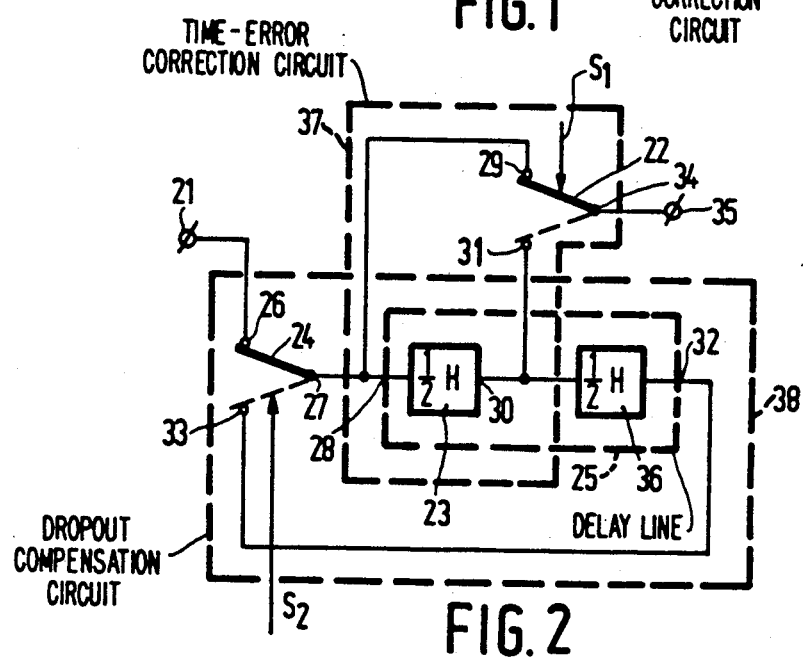
FIG. 2 shows a first modification of the device shown in FIG. 1.
Figure 3:
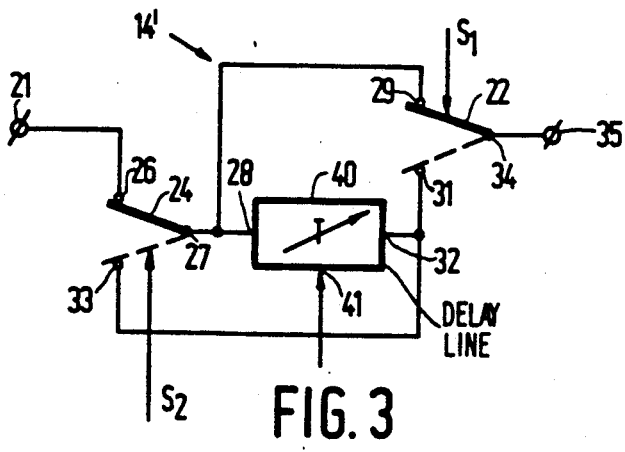
FIG. 3 shows a second modification of the device shown in FIG. 1.
Figure 5A:
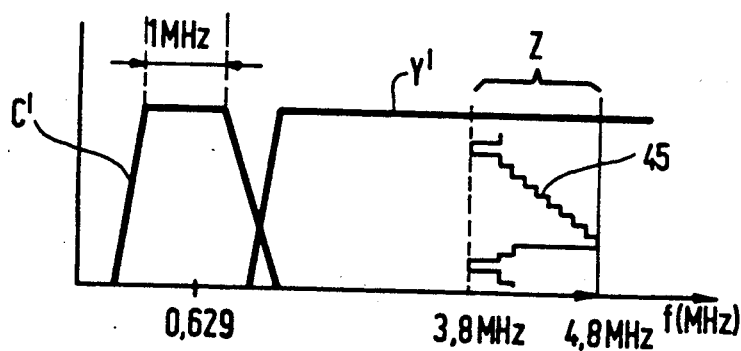
FIG. 5a shows diagrammatically a frequency-response characteristic of a PAL video signal as recorded by means of a VHS video recorder and FIG. 5b shows diagrammatically the frequency response characteristic of the PAL television signal.
Figure 5B:
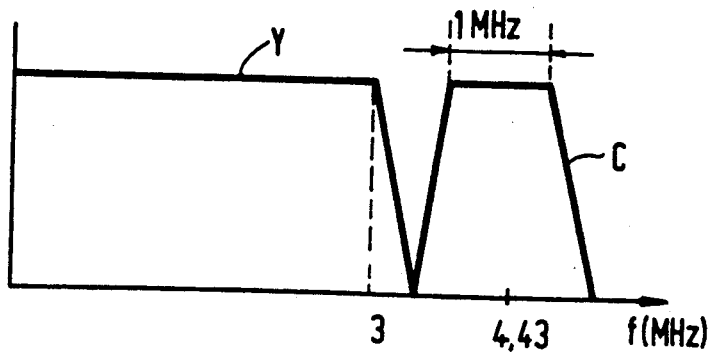

The output 5 of the reproducing means 1 is coupled to an input 7 of a separating unit 8 via an amplifier stage 6. This separating unit 8 comprises a high-pass filter 9 having a cut-off frequency of approximately 1.4 MHz and a low-pass filter 10 having a cut-off frequency which is also approximately 1.4 MHz. The high-pass filter 9 separates the frequency-modulated luminance signal Y' from the composite video signal and supplies it to the output 11. The low-pass filter 10 separates the chrominance signal from the video signal and applies it to the output 12. In the FM demodulator 13, the luminance signal is converted to a frequency band from 0 to approximately 3 MHz, see the curve Y in the frequency response characteristic shown in FIG. 5b. Subsequently, the signal Y is applied to an input 15 of a signal-combination unit 16 via a combined time-error and dropout compensation circuit 14, examples of which are shown in FIGS. 2 and 3 and will be described hereinafter. The signal C' is applied to a frequency converter 18 via a time-correction circuit 17 to be described hereinafter. In this converter 18, the signal C' is converted to a frequency band of ±500 kHz around a carrier frequency of 4.43 MHz, see the curve C in FIG. 5b. Subsequently, the quadrature-modulated signal C is applied to the input 19 of the signal-combination unit 16. The PAL television signal is then available on the output 20.

FIG. 2 shows an embodiment of the circuit 14 in FIG. 1. The circuit 14 is intended for correcting time errors in the luminance signal read from the record carrier 64 and for this purposes it comprises a circuit 37 comprising a first switching unit 22, which can be switched over in response to a first control signal S1, and a first delay line 23. The circuit 14 is also intended to provide compensation for dropouts in the luminance signal read from the record carrier and for this purpose it comprises a circuit 38 comprising a second switching unit 24, which can be switched over in response to a second control signal S2, and a second delay line 25. At least a section 23 of the second delay line 25 constitutes the first delay line 23. The first delay line 23 provides a delay of half a line period (H/2) in the video signal, i.e. a delay of 32 μs. The second delay line 25 provides a delay of one line period (H), i.e. 64 μs. The input 21 of the circuit 14 is coupled to a first terminal 26 of the switching unit 24. The output terminal 27 is coupled to the input 28 of the delay line 25 and to the first terminal 29 of the switching unit 22. The output 30 of the delay line 23 is coupled to the second terminal 31 of the switching unit 22. The output 32 of the delay line 25 is coupled to the second terminal 33 of the switching unit 24. The output terminal 34 of the switching unit 22 is coupled to the output 35 of the circuit 14. Dropout compensation by means of the feedback delay line 25 is effected in such a way that if a dropout detector (not shown) in the device detects a dropout, the dropout detector supplies a control signal S2 to the switching unit 24, which in response thereto is set to the position not shown. The switching unit 22 is then in a position in which either the terminal 29 or the terminal 31 is coupled to the terminal 34. Instead of the line read instantaneously, the luminance signal read during the preceding line is now applied to the output 35. As soon as the dropout has ceased the control signal S2 is discontinued, so that the switching unit 24 is reset to the position shown in FIG. 2.

Figure 4A:
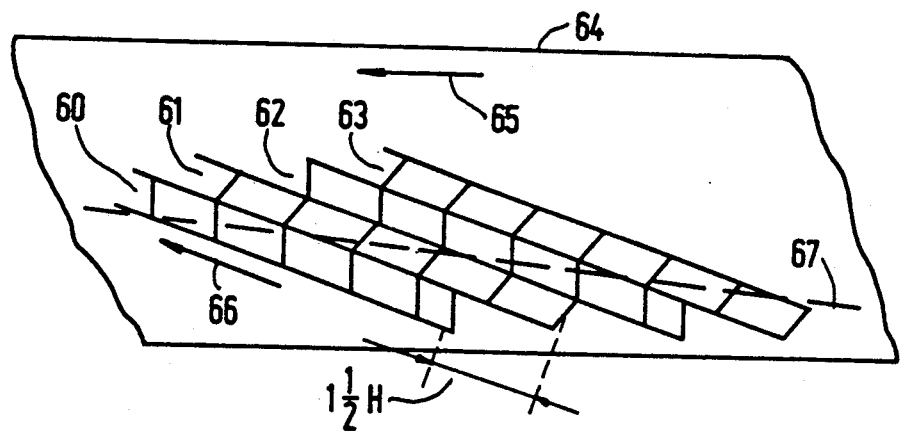
FIG. 4a shows the tracks on the magnetic record carrier recorded at the normal record-carrier speed.

How the time-error correction operates will now be explained with reference to FIG. 4. FIG. 4a shows the record carrier 64 with adjacent tracks 60, 61, 62 ... etc. These tracks are recorded on this record carrier with a speed of transport equal to the "normal" speed of transport, i.e. the speed of transport in the "short play" mode. The tracks on the record carrier adjoin one another in such a way that every two adjacent tracks are offset from one another over a length of 1.5 line. Since each track contains 312.5 lines, this means that the horizontal synchronizing pulses in adjacent tracks are also situated adjacent one another. If the video information is read from the tracks at a record carrier speed which is not the same as the speed during recording, a reproducing head can no longer follow the track exactly but follows, for example, the broken line 67 across the record carrier. Now no time error will arise in the luminance signal being read at the transition from a track (for example track 60) read by the reproducing head 2 to the next track to be read (i.e. track 62) by said head 2.

Figure 4B:
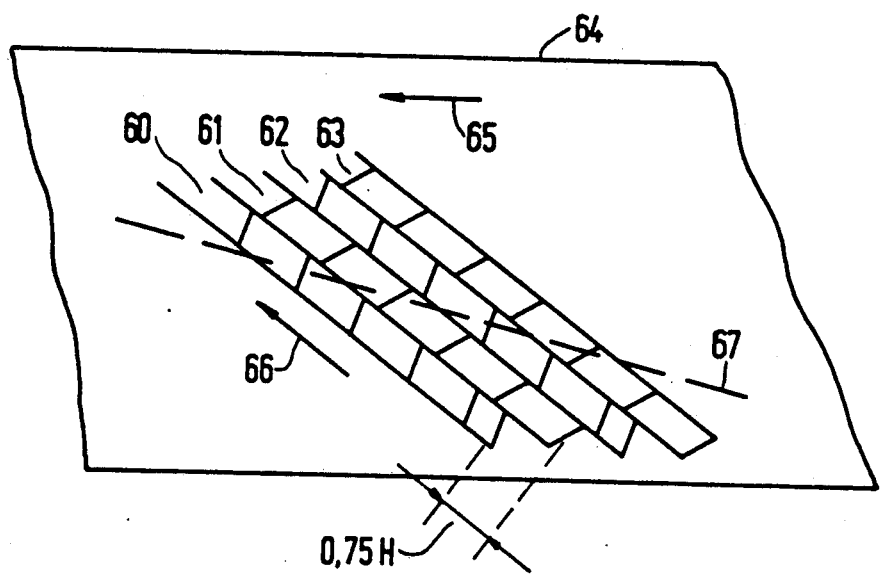
FIG. 4b shows the same tracks but now recorded at a record-carrier speed equal to half the normal transport speed.

The situation changes if the speed of the record carrier during recording differs from (is lower than) said "normal" speed. FIG. 4b shows the tracks which have been recorded at a record carrier speed which is a factor of 2 smaller, the so-called long play mode. The tracks now extend at a larger angle relative to the longitudinal direction of the record carrier and are now offset from one another by 0.75 of a line. The broken line 67 in FIG. 4b again represents the path along which a reproducing head moves relative to the record carrier if the speed of the record carrier during reproduction differs from that during recording. When changing over from reading a track, for example track 60, to reading a following track, i.e. the track 62, this results in a time error of half a line period, i.e. approximately 32 μs, between the signals read from the two tracks. It is obvious that this also applies to the signals read from the tracks 61, 63 ... etc. For the sake of clarity, the individual lines are not shown in the tracks 61, 63, ... etc. in FIG. 4b.

In order to compensate for this time error, the transitions are detected and at every transition, a control signal S1 is generated, which causes the switching unit 22 in FIG. 2 to be set to the other position. If the switching unit 22 is in the upper position, this means that it is set to the lower position, and vice versa. At every transition a compensation is then provided for a time error of half a line period. If it is not necessary to compensate for time errors between the chrominance signal and the luminance signal in the two channels to the signal-combination unit 16 by means of the delay-line section 23, the switching unit 22 is set to the upper position in the rest condition (the time-error correction is then disabled during normal reproduction).

Time-error correction may also be applied by the other H/2 delay-line section 36 in the delay line 25, together with the switching unit 22. In that case, the output 32 should be coupled to the terminal 29. Moreover, in the chrominance signal path from the output 12 to the input 19 in FIG. 1, a correction has to be applied for the additional delay 23. However, the chrominance signal has already been delayed by a full line period by means of a comb filter (not shown) in the device, which filter is intended for reducing crosstalk of chrominance signals from adjacent tracks. If the H/2 delay-line section 36 is now used for time-error correction and care is taken that in the rest condition of the switching unit 22 this unit is set to the lower position (terminals 31 and 34 are interconnected) during normal reproduction (the time-error correction circuit 37 is then inoperative), the delay-line sections 23 and 36 will automatically provide compensation for the 1 H time difference between the chrominance and the luminance signal introduced by the comb-filter.

The time-error correction circuit 17 in FIG. 1 may be identical to the circuit of FIG. 2 and operates in the same way as the circuit 37. However, obviously, care must be taken that the switching units 22 in the two time-error correction circuits are set so as to preclude time errors between the chrominance and the luminance signal. Since the chrominance signal is recorded on the record carrier at a comparatively low frequency, a dropout compensation for the chrominance signal may be dispensed with.

The delay lines may be constructed as charge-coupled devices (CCD lines), as charge transfer devices (bucket brigades), or as digital delay lines.

In comparison with a situation in which the composite signal appearing on the output 20 is delayed by means of a 1 H CCD delay line, the device in accordance with the invention enables both the clock frequency required for the CCD lines and the required storage capacity to be reduced.

The following is a numerical example: the clock frequency required for driving the 1 H CCD line which delays the complete CVBS signal is generally locked to (a multiple) of the subcarrier frequency $f_s$, which is 4.43 MHz. The clock frequency is then equal to $3.f_s$. For delaying the luminance signal in the delay lines 23, 36 only a clock frequency of approximately 6.6 MHz is required and for delaying the chrominance signal by half a line period in the circuit 17 only a clock frequency of approximately 2.4 MHz is needed. As a result of this the storage capacity is reduced by a factor equal to 1.7 (=13.3/6.6+1.2).

FIG. 3 shows a second embodiment of the circuit 14 shown in FIG. 1. The circuit 14' of FIG. 3 bears much resemblance to the circuit of FIG. 2, except that the first delay line 23 and the second delay line 25 in FIG. 2 are now constituted by a delay line 40 having a variable delay time T. If the circuit 14' serves to compensate for dropouts the delay line 40 provides a delay of 1 H. If the circuit 14' serves for time-error correction the delay line 40 provides a delay of H/2. If the delay line 40 is a CCD line these two delay times can be obtained by applying a clock frequency to a control input 41, which frequency in the first-mentioned case is half that in the last-mentioned case. During reproduction at a record-carrier speed which differs from that during recording the dropout compensation is disabled.

What is claimed is:

1. A device for reproducing a luminance signal from a magnetic record carrier in tracks which are inclined relative to the longitudinal direction of said record carrier, said device being capable of operating with a speed of transport of said record carrier during reproduction being either the same as or different from that during recording of said record carrier, and when said speed is different from that during recording, a time error of approximately half a line period being introduced in the luminance signal being read at every transition from a track read by a reproducing head to a following track to be read by the same head, said device comprising:

a first correction circuit for correcting said time error in response to a first control signal when said speed is different from that during recording, said first correction circuit comprising first delay means having an input and an output, and first switching means having a control signal input for receiving said first control signal, a first and a second input, and an output, the first and the second inputs being coupled, respectively, to said input and output of said first delay means;

a second correction circuit for the compensation of dropouts in the luminance signal read from the tracks in response to a second control signal when said speed is the same as that during recording, said second correction circuit comprising second delay means having an input and an output, and second switching means having a control signal input for receiving said second control signal, a first and a second input, and an output, said output being coupled to the input of said second delay means and the output of said second delay means being coupled to the second input, and said first input being coupled to said reproducing head for receiving said luminance signal; and an output of said device for supplying a corrected luminance signal coupled to the output of said first switching means; characterized in that at least a portion of said second delay means comprises said first delay means and wherein the input of said first delay means is further coupled to the output of said second switching means and the output of said second switching means is coupled to the first input of said first switching means, whereby for time error correction, said second switching means couples the input of said first delay means to said reproducing head while said first switching means alternatively couples the input and the output of said first delay means to said device output, while for dropout compensations, said first switching means couples the output of said second switching means to said device output while the second switching means alternatively couples the reproducing head and the output of said second delay means to the output of said second switching means.

2. A device as claimed in claim 1, characterized in that the second delay means comprises two series connected delay-line sections arranged between the output and the second input of the second switching means, and in that said first delay means comprises one of said two delay-line sections.

3. A device as claimed in claim 1, characterized in that the second delay means is constructed as a charge-coupled device.

4. A device as claimed in claim 1, characterized in that the second delay means is constructed as a charge-transfer device.

5. A device as claimed in claim 4, characterized in that said charge-transfer device comprises a bucket-brigade device.

6. A device as claimed in claim 1, characterized in that the second delay means is constructed as a digital delay line.

7. A device as claimed in claim 1, characterized in that said first and second delay means comprise a variable delay line having a control signal input for receiving said first control signal, wherein in response to said first control signal, said variable delay line provides a delay corresponding to that of said first delay means.

* * * * *